US012794150B2

(12) United States Patent
Aonuma et al.

(10) Patent No.: US 12,794,150 B2
(45) Date of Patent: Nov. 10, 2026

(54) POWER STORAGE DEVICE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Takuro Aonuma, Kariya (JP); Hiromi Ueda, Kariya (JP); Shigeru Fukuda, Nagoya (JP); Kazuki Maeda, Kariya (JP); Naoto Morisaku, Kariya (JP)

(73) Assignees: KABUSHIKI KAISHA TOYOTA JIDOSHOKKI, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 713 days.

(21) Appl. No.: 18/207,415

(22) Filed: Jun. 8, 2023

(65) Prior Publication Data

US 2024/0055783 A1 Feb. 15, 2024

(30) Foreign Application Priority Data

Jun. 10, 2022 (JP) ................................ 2022-094668

(51) Int. Cl.

| | |
|---|---|
| ***H01M 50/54*** | (2021.01) |
| ***H01M 10/34*** | (2006.01) |
| ***H01M 50/176*** | (2021.01) |
| ***H01M 50/567*** | (2021.01) |
| ***H01M 50/591*** | (2021.01) |
| ***H01R 4/30*** | (2006.01) |
| ***H01R 4/70*** | (2006.01) |

(Continued)

(52) U.S. Cl.

CPC ............ *H01R 4/70* (2013.01); *H01M 10/345* (2013.01); *H01M 50/176* (2021.01); *H01M 50/54* (2021.01); *H01M 50/567* (2021.01); *H01M 50/591* (2021.01); *H01R 4/308* (2013.01); *H01M 2004/029* (2013.01); *H01R 11/12* (2013.01)

(58) Field of Classification Search

None

See application file for complete search history.

(56) References Cited

U.S. PATENT DOCUMENTS

2022/0094025 A1 3/2022 Oide et al.
2022/0320627 A1* 10/2022 Kato .................. H01M 50/186

FOREIGN PATENT DOCUMENTS

JP 2007-213990 A 8/2007
JP 2012-221738 A 11/2012

(Continued)

OTHER PUBLICATIONS

CN112740466A (Year: 2021).*
CN116114104A (Year: 2023).*

*Primary Examiner* — Tracy M Dove

(74) *Attorney, Agent, or Firm* — Sughrue Mion, PLLC

(57) ABSTRACT

A power storage device includes a terminal cover mounted in a terminal base. The terminal cover includes a base portion attached to the terminal base, cover the terminal base, and have an opening exposing a terminal bolt; and a cover portion attached to the base portion and covering at least the opening. The base portion has a first wall and a second wall protruding in a second direction from the base portion and facing each other with a wiring sandwiched therebetween.

10 Claims, 8 Drawing Sheets

(51) Int. Cl.
*H01M 4/02* (2006.01)
*H01R 11/12* (2006.01)

(56) References Cited

FOREIGN PATENT DOCUMENTS

| | | | | |
|---|---|---|---|---|
| JP | 2022-052170 | A | 4/2022 | |
| WO | WO-2018055858 | A1 * | 3/2018 | .......... H01M 50/477 |

* cited by examiner

POWER STORAGE DEVICE

CROSS-REFERENCE TO RELATED APPLICATIONS

This application claims the benefit of priority from Japanese Patent Application No. 2022-094668, filed on Jun. 10, 2022, the entire content of which is incorporated herein by reference.

TECHNICAL FIELD

The present disclosure relates to a power storage device.

BACKGROUND

Japanese Unexamined Patent Publication No. 2007-213990 discloses a battery module. This battery module includes a bipolar battery having a plurality of bipolar electrodes stacked therein, a pair of holding plates holding the bipolar battery by sandwiching it in a stacking direction of the bipolar electrodes, a positive electrode terminal electrically connected to a positive electrode side of the bipolar battery through one holding plate, and a negative electrode terminal electrically connected to a negative electrode side of the bipolar battery through the other holding plate.

SUMMARY

Generally, when power is output from a battery module, in order to protect power output terminal bolts such as a positive electrode terminal and a negative electrode terminal from contact with other objects, it is conceivable that the terminal bolts be covered by terminal covers. In such a case, in a constitution in which a power output wiring connected to a terminal bolt is drawn out from a terminal cover in an axial direction of the terminal bolt, when the wiring is connected to the terminal bolt using a nut, it is conceivable that corotation of the nut and the wiring occur.

The present disclosure provides a power storage device capable of curbing occurrence of corotation of a nut and a wiring when the wiring is connected to a terminal bolt in a constitution in which a power output wiring connected to a terminal bolt is drawn out from a terminal cover in an axial direction of the terminal bolt.

A power storage device of the present disclosure includes a stacked body configured to have a power storage module in which electrodes including a plurality of bipolar electrodes are stacked in a first direction; a pair of current collector plates configured to be respectively stacked at both ends of the stacked body in the first direction; a pair of restraint plates configured to sandwich and restrain the stacked body and the pair of current collector plates in the first direction; a terminal base configured to have a terminal bolt electrically connected to a terminal of at least one of the current collector plates and protruding in a second direction intersecting the first direction fixed thereto, and be provided on a terminal base installation surface that is a side surface extending in a third direction intersecting both the first direction and the second direction, and the first direction in at least one of the restraint plates; a power output wiring configured to be fixed to the terminal bolt; and a terminal cover configured to be mounted in the terminal base. The terminal cover is configured to include a base portion attached to the terminal base, covering the terminal base, and having an opening exposing the terminal bolt; and a cover portion attached to the base portion and covering at least the opening. The base portion is configured to have a holding portion provided adjacent to the opening and holding the wiring drawn out in the second direction from the terminal base. The holding portion is configured to have a first wall and a second wall protruding in the second direction from the base portion and facing each other with the wiring sandwiched therebetween.

According to this power storage device, in a state where the terminal cover is attached to the terminal base such that the terminal bolt is covered, while contact between the terminal bolt and other objects is curbed, the wiring connected to the terminal bolt can be guided to the outside through the opening. Since the terminal cover is provided with the holding portion, the wiring guided to the outside is drawn out in the second direction, that is, an extending direction of the terminal bolt. In this case, since the wiring which has passed through the opening is held in a space defined by the first wall and the second wall facing each other, corotation of the wiring is curbed by abutting the first wall or the second wall.

The holding portion may be configured to further have a third wall protruding in the second direction from the base portion and connecting the first wall and the second wall to each other, and exhibit substantially a tubular shape having a slit formed on a side facing the opening. In this constitution, the wiring which has passed through the opening is held inside the holding portion having substantially a tubular shape through the slit.

The at least one of the restraint plates may be configured to have a pair of projecting portions projecting in the second direction beyond the terminal base installation surface when viewed in the first direction. The terminal base may be configured to be disposed on the terminal base installation surface between the pair of projecting portions when viewed in the first direction. In this constitution, the projecting portions can function as protection walls protecting the terminal base.

In a state where the cover portion is attached to the base portion, the cover portion may be configured to have a wall body facing the third wall with the wiring sandwiched therebetween and covering the slit. In this constitution, since the slit of the holding portion is covered by the wall body, insulation properties of the terminal bolt can be enhanced.

The base portion and the cover portion may be configured to be fixed by being engaged with each other. In this constitution, the cover portion can be simply fixed to the base portion.

The base portion and the cover portion may be configured to be connected to each other by a hinge portion. In this constitution, since the base portion and the cover portion are integrated, for example, the base portion can be easily covered by the cover portion.

The base portion may be configured to include a side wall surrounding the terminal base when viewed in the second direction and an end portion wall having the opening provided therein. The cover portion may be configured to include a plate-shaped portion covering the end portion wall and a protruding piece protruding from the plate-shaped portion such that a part of the side wall is covered. A first engagement portion may be configured to be formed in the side wall of the base portion, and a second engagement portion engaged with the first engagement portion may be configured to be formed in the protruding piece of the cover portion. In this constitution, due to a simple constitution, the cover portion can be engaged with the base portion.

In a state where the cover portion is engaged with the base portion, a gap allowing communication through the opening to the outside of the terminal cover may be configured to be formed between an outer surface of the base portion and an inner surface of the cover portion. In this constitution, heat trapped on an inward side of the base portion can be guided to the outside through the gap.

An outer surface of the side wall of the base portion may be configured to have an outer rib adjacent to the first engagement portion. In this constitution, the strength of the first engagement portion can be enhanced.

An inner surface of the end portion wall of the base portion may be configured to have an inner rib. In this constitution, the strength of the base portion can be enhanced.

The electrodes may each be configured to include an electrode plate having a first surface and a second surface on a side opposite to the first surface in the first direction. The stacked body may be configured to have the power storage module including a plurality of the electrodes stacked therein such that the first surfaces of the electrode plates are directed in the same direction in the first direction, and a seal portion defining a space accommodating the electrodes adjacent to each other in the first direction and an electrolyte. The electrodes included in the power storage module may be configured to be constituted of the bipolar electrodes each having the electrode plate, a positive electrode active material layer provided on the first surface of the electrode plate, and a negative electrode active material layer provided on the second surface of the electrode plate; a positive electrode termination electrode having the electrode plate and the positive electrode active material layer provided on the first surface of the electrode plate and having the second surface of the electrode plate forming a current output surface exposed from the seal portion; and a negative electrode termination electrode having the electrode plate and the negative electrode active material layer provided on the second surface of the electrode plate and having the first surface of the electrode plate forming a current output surface exposed from the seal portion.

DETAILED DESCRIPTION

Figure 1:
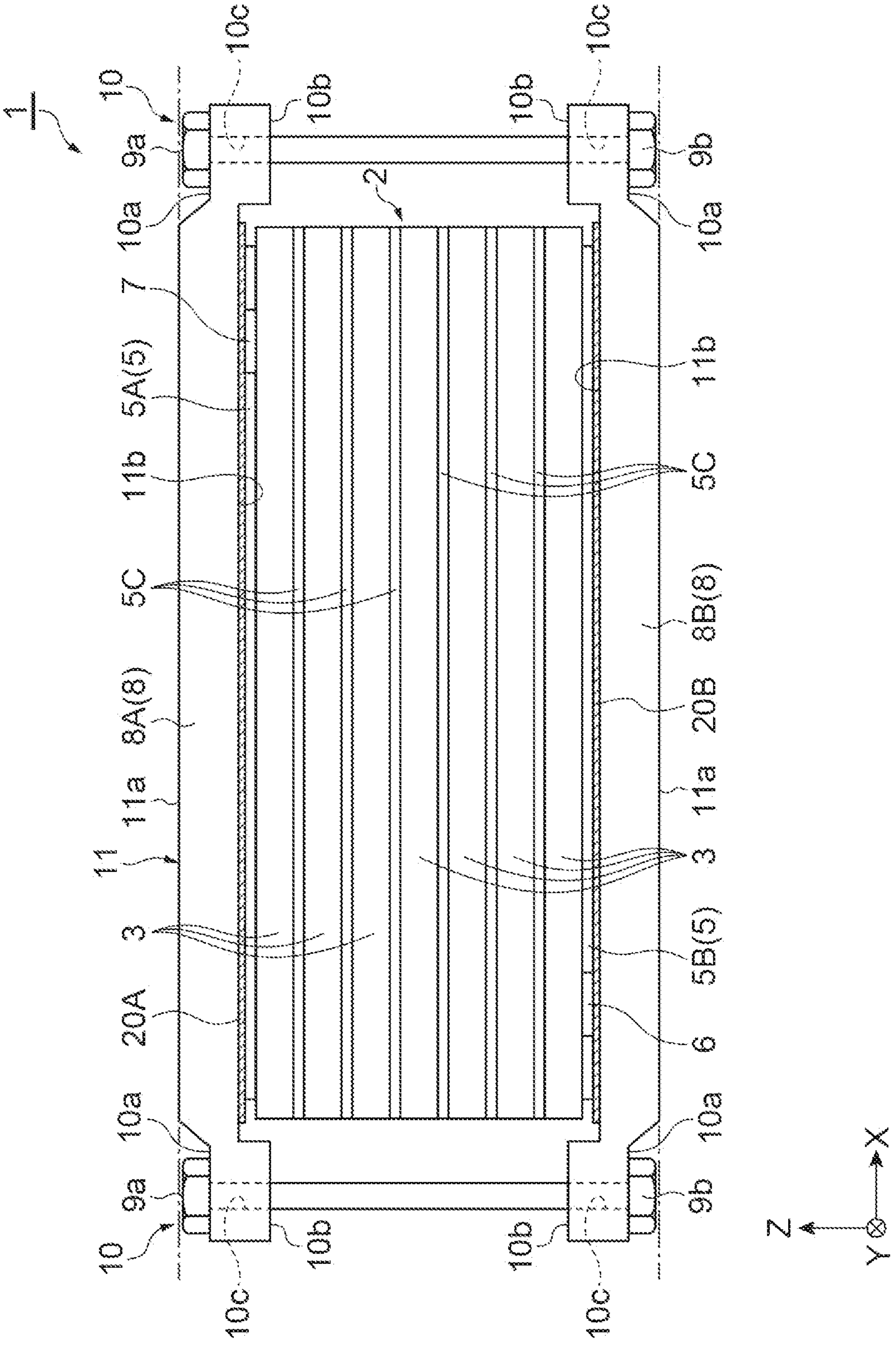
FIG. 1 is a schematic view of a power storage device according to an example.

Hereinafter, an embodiment of the present disclosure will be described in detail with reference to the accompanying drawings. In description of the drawings, the same reference signs are used for elements which are the same or equivalent, and duplicate description will be omitted. In the drawings, an orthogonal coordinate system having an X axis direction, a Y axis direction, and a Z axis direction will be indicated. Hereinafter, the Z axis direction may be described as an upward-downward direction. In addition, one side and the other side in the X axis direction, the Y axis direction, and the Z axis direction may be described as a positive side and a negative side in accordance with the direction of each axis of coordinates.

Figure 2:
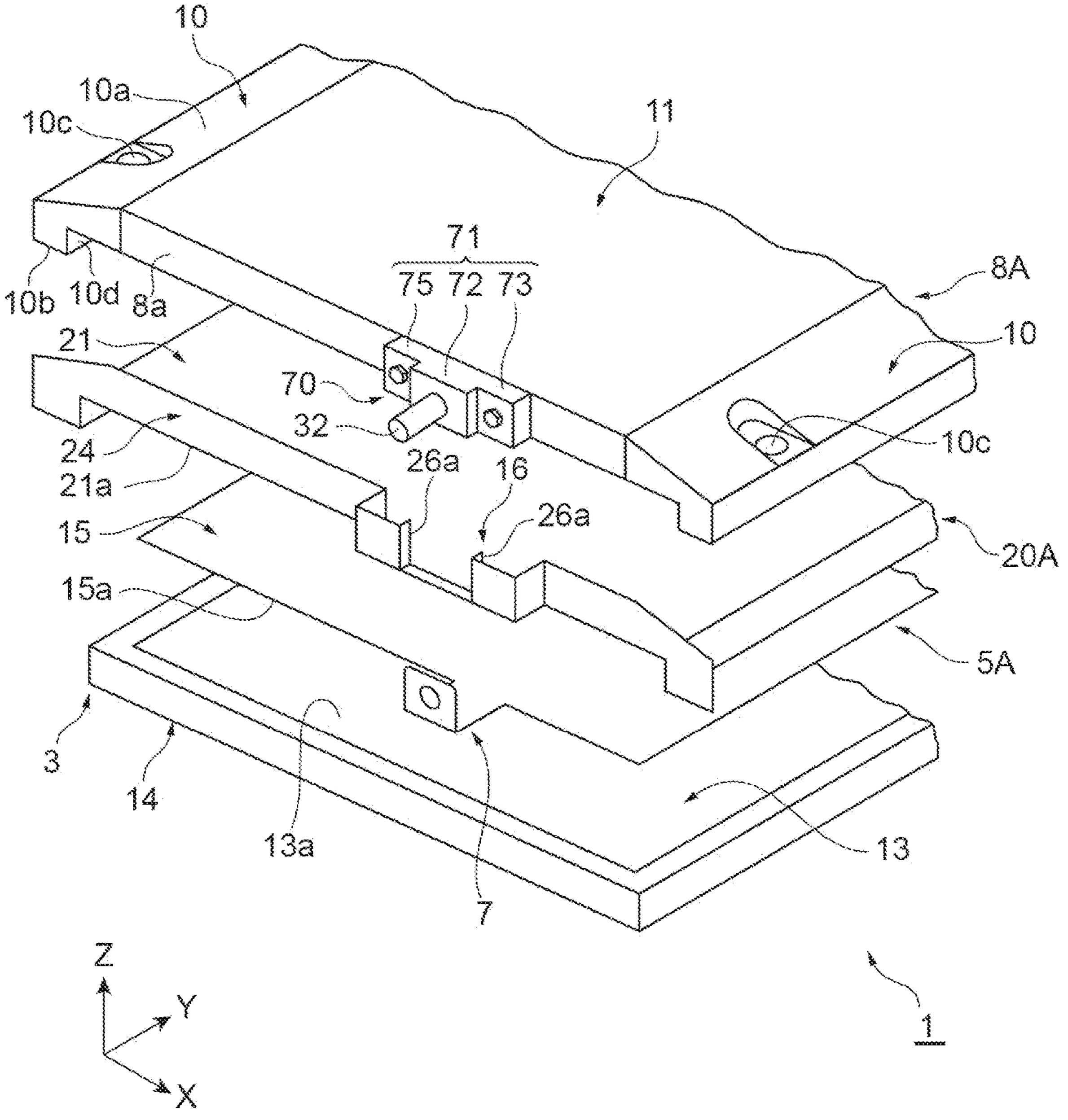
FIG. 2 is an exploded perspective view illustrating a constitution of a part near an end portion on one side in a Z axis direction in the power storage device according to the example.

FIG. 1 is a schematic view of a power storage device according to an example. FIG. 2 is an exploded perspective view illustrating a constitution of a part near an end portion on an upper side in the Z axis direction in the power storage device according to the example. For example, a power storage device 1 is used as a battery for various kinds of vehicles such as a forklift, a hybrid car, and an electric car. The power storage device 1 according to an example includes a stacked body 2 including a plurality of stacked bipolar electrodes, current collector plates 5A and 5B, insulating plates 20A and 20B, restraint plates 8, a terminal base 70, and a terminal cover 100. In this specification, for the sake of convenience, a stacking direction of electrodes including the bipolar electrodes is referred to as the Z axis direction, a direction substantially orthogonal to the stacking direction, that is a longitudinal direction of power storage modules 3 viewed in the stacking direction is referred to as the Y axis direction, and a direction substantially orthogonal to the stacking direction, that is a transverse direction of the power storage modules 3 is referred to as the X axis direction. In the present embodiment, the Z axis direction coincides with a vertical direction, the positive side in the Z axis direction coincides with the upper side in the vertical direction, and the negative side in the Z axis direction coincides with the lower side in the vertical direction.

The stacked body 2 according to an example includes a plurality of (seven in the present embodiment) power storage modules 3 and a plurality of (six in the present embodiment) conductive plates 5C. The power storage modules 3 are each constituted by stacking a plurality of electrodes including bipolar electrodes. The stacked body 2 is formed by alternately stacking the power storage modules 3 and the conductive plates 5C. The stacked body 2 may have only one power storage module 3. In such a case, the conductive plates 5C are not provided. For example, the power storage modules 3 are secondary batteries such as nickel-hydride secondary batteries or lithium-ion secondary batteries. However, the power storage device 1 is not limited to the foregoing secondary batteries and may be an electric double layer capacitor, for example. In the present embodiment, the power storage device 1 is a nickel-hydride secondary battery.

In the bipolar electrodes of the power storage modules 3, a positive electrode (positive electrode active material layer) is formed on a first surface (for example, a lower surface) that is one surface of an electrode plate, and a negative electrode (negative electrode active material layer) is formed on a second surface (for example, an upper surface) that is the other surface. The power storage modules 3 each include an electrode stacked body 13 constituted by alternately stacking a plurality of bipolar electrodes and a plurality of separators (refer to FIG. 2). In addition, a seal member 14 (seal portion) made of frame-shaped insulating resin is provided on a side surface of the electrode stacked body 13. That is, the side surface of the electrode stacked body 13 is sealed by the seal member 14. Inside the electrode stacked body 13, an electrolytic solution (electrolyte) is enclosed inside a space defined by the electrodes and the seal member 14 adjacent to each other in the Z axis direction. The power storage modules 3 each include a positive electrode termination electrode and a negative electrode termination electrode respectively having current output surfaces 13*a* on the positive electrode side and the negative electrode side at both ends in the Z axis direction. The current output surfaces 13*a* are surfaces outputting a current from each of the power storage modules 3. The current output surfaces 13*a* are formed by exposing the electrodes of the electrode stacked body 13 from the seal member 14. That is, the positive electrode termination electrode has the electrode plate and the positive electrode provided on the first surface of the electrode plate and forms the current output surface 13*a* by exposing the second surface of the electrode plate from the seal member 14. In addition, the negative electrode termination electrode has the electrode plate and the negative electrode provided on the second surface of the electrode plate and forms the current output surface 13*a* by exposing the first surface of the electrode plate from the seal member 14.

A plurality of power storage modules 3 are stacked in the Z axis direction with the conductive plates 5C therebetween. The power storage modules 3 adjacent to each other in the Z axis direction are electrically connected to each other with the conductive plates 5C therebetween. That is, the stacked body 2 is constituted by alternately stacking the power storage modules 3 and the conductive plates 5C. Between the power storage modules 3 adjacent to each other in the Z axis direction, the conductive plates 5C are formed to have a rectangular plate shape and disposed in a contact manner between the current output surfaces 13*a* of the electrode stacked bodies 13 facing each other.

As illustrated in FIG. 1, the current collector plates 5A and 5B are respectively stacked at one end and the other end that are both ends of the stacked body 2 in the Z axis direction (first direction) that is also the stacking direction of the stacked body 2. That is, a pair of current collector plates 5A and 5B are disposed at positions sandwiching the stacked body 2 therebetween in the Z axis direction that is the stacking direction. The current collector plate 5A according to an example has a main body portion 15 having a rectangular plate shape brought into contact with the current output surface 13*a* of the electrode stacked body 13 of the power storage module 3 on the negative electrode side positioned at one end of the stacked body 2, and a negative electrode terminal 7 (terminal) having an outer edge portion 15*a* of the main body portion 15 as a base end and protruding in the Y axis direction. For example, the negative electrode terminal 7 has a plate shape and is formed integrally with the main body portion 15.

The current collector plate 5A has a shape similar to that of the current collector plate 5B. That is, the current collector plate 5B has a main body portion having a rectangular plate shape brought into contact with the current output surface 13*a* of the electrode stacked body 13 of the power storage module 3 on the positive electrode side positioned at the other end of the stacked body 2, and a positive electrode terminal 6 (terminal) having an outer edge portion of the main body portion as a base end and protruding in the Y axis direction. Charging and discharging of the power storage device 1 are performed through the negative electrode terminal 7 and the positive electrode terminal 6. In an example, the negative electrode terminal 7 is provided at a position closer to the positive side in the X axis direction, and the positive electrode terminal 6 is provided at a position closer to the negative side in the X axis direction. In the following description, the current collector plates 5A and 5B may be referred to as the current collector plates 5.

The restraint plates 8 restrain the stacked body 2 and the current collector plates 5A and 5B in the Z axis direction. The restraint plates 8 are rectangular metal plates having a surface area slightly larger than a surface area of the power storage module 3 viewed in the Z axis direction. The restraint plate 8 has a main body portion 11 overlapping the stacked body 2 when viewed in the Z axis direction, and edge portions 10 extending in the X axis direction from the main body portion 11 and not overlapping the stacked body 2 when viewed in the Z axis direction. In the present embodiment, a pair of edge portions 10 are respectively provided on both sides of the main body portion 11 in the X axis direction. That is, the main body portion 11 is sandwiched between the pair of edge portions 10. The edge portions 10 each have an inner surface 10*b* directed to an inward side in the Z axis direction, and an outer surface 10*a* directed to an outward side in the Z axis direction. The main body portion 11 has an inner surface 11*b* directed to the inward side in the Z axis direction (a side of the power storage modules 3 in the Z axis direction), and an outer surface 11*a* that is a surface on a side opposite to the inner surface 11*b* and directed to the outward side in the Z axis direction (a side opposite to the power storage modules 3 in the Z axis direction). The outer surface 10*a* extends in a manner of being inclined from an end edge of the outer surface 11*a* to the inward side in the Z axis direction toward the outward side in the X axis direction. The inner surface 10*b* is positioned on the inward side in the Z axis direction from the inner surface 11*b*.

The pair of edge portions 10 are outer edge parts extending in the longitudinal direction (Y axis direction) of the restraint plates 8. The pair of edge portions 10 are disposed such that they do not overlap the stacked body 2 when viewed in the Z axis direction. Each of the edge portions 10 is provided with a plurality of insertion holes 10*c* through which a bolt 9*a* is inserted. As illustrated in FIG. 2, the insertion holes 10*c* according to an example are respectively provided in notch parts in which the outer surfaces 10*a* are formed along an XY plane. In each of the edge portions 10, the plurality of insertion holes 10*c* are disposed such that they are separated from each other in the longitudinal direction (Y axis direction) of the restraint plates 8. In the present embodiment, the plurality of insertion holes 10*c* are disposed with an equal interval therebetween from one end to the other end of the edge portion 10 in the longitudinal direction of the restraint plates 8. In the illustrated example, a protruding portion 10*d* protruding to the inward side in the Z axis direction is formed at an outer end edge of the edge portion 10 in the X axis direction. The plurality of insertion holes 10*c* penetrate the protruding portion 10*d*.

A head portion of the bolt 9*a* is disposed on the outer surface 10*a* of the restraint plate 8A. A tip portion (screw tip) of a shaft portion of the bolt 9*a* protrudes from the outer surface 10*a* of the restraint plate 8B. A nut 9*b* is screwed to the tip portion of the bolt 9*a*. The nut 9*b* is disposed on the outer surface 10*a* of the restraint plate 8B. Accordingly, the plurality of power storage modules 3, the plurality of conductive plates 5C, and the current collector plates 5A and 5B are sandwiched between the restraint plates 8A and 8B. In addition, a restraint load in the Z axis direction is applied to the stacked body 2.

The insulating plates 20A and 20B insulate the restraint plates 8 and the current collector plates 5A and 5B from each other. The insulating plate 20A is provided between the current collector plate 5A and the restraint plate 8A. The insulating plate 20A is a member for securing insulation properties between the current collector plate 5A and the restraint plate 8A. For example, the insulating plate 20A is formed of a resin having insulation properties. In addition, the insulating plate 20B is provided between the current collector plate 5B and the restraint plate 8B. The insulating plate 20B is a member for securing insulation properties between the current collector plate 5B and the restraint plate 8B. For example, the insulating plate 20B is formed of a resin having insulation properties.

The terminal base 70 is fixed to a terminal base installation surface 8*a* provided in the restraint plate 8. The terminal base installation surface 8*a* may be a side surface extending in the X axis direction (third direction) and the Z axis direction in the main body portion 11 of the restraint plate 8. In the power storage device 1 according to the example, the terminal base 70 may be provided in each of the restraint plates 8A and 8B in a similar manner. The negative electrode terminal 7 of the current collector plate 5A is fixed to the terminal base 70 provided in the restraint plate 8A. The terminal base 70 according to an example has a pedestal portion 71 having substantially a rectangular parallelepiped shape of which the longitudinal direction is the X axis direction. For example, the pedestal portion 71 is formed of a resin having insulation properties. In the pedestal portion 71 in the illustrated example, the size in the Y axis direction in parts on both end sides in the X axis direction is smaller than the size in the Y axis direction in a central part in the X axis direction. That is, the pedestal portion 71 includes a central portion 72 protruding in the Y axis direction at the center in the X axis direction, and a pair of end portions 73 and 75 further recessed in the Y axis direction on both end sides in the X axis direction than the central portion 72. A terminal bolt 32 protruding in the Z axis direction is provided in the central portion 72 of the pedestal portion 71.

Figure 3:
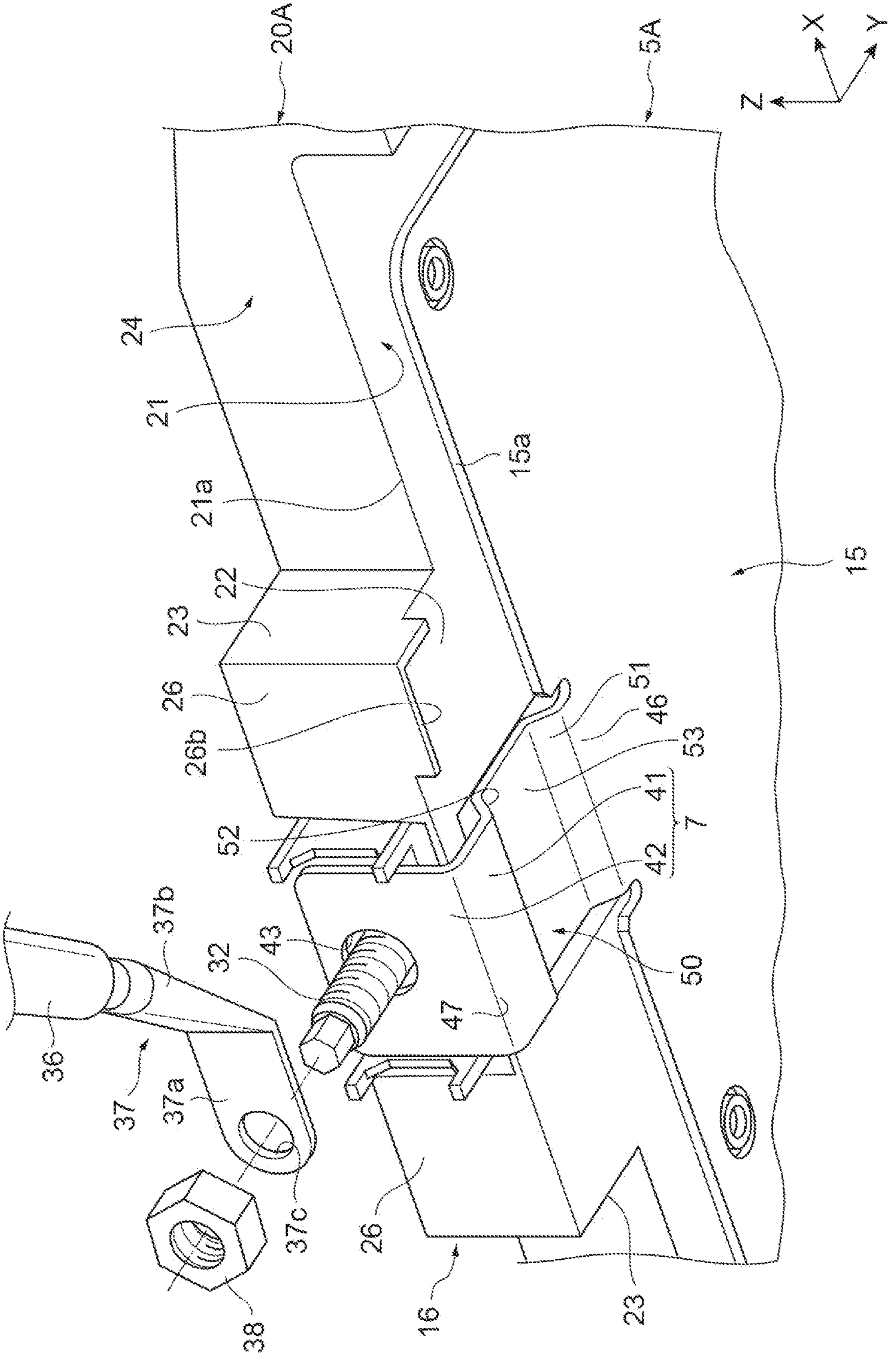
FIG. 3 is a perspective view illustrating a part in the vicinity of a terminal base in the power storage device according to the example.
Figure 4:
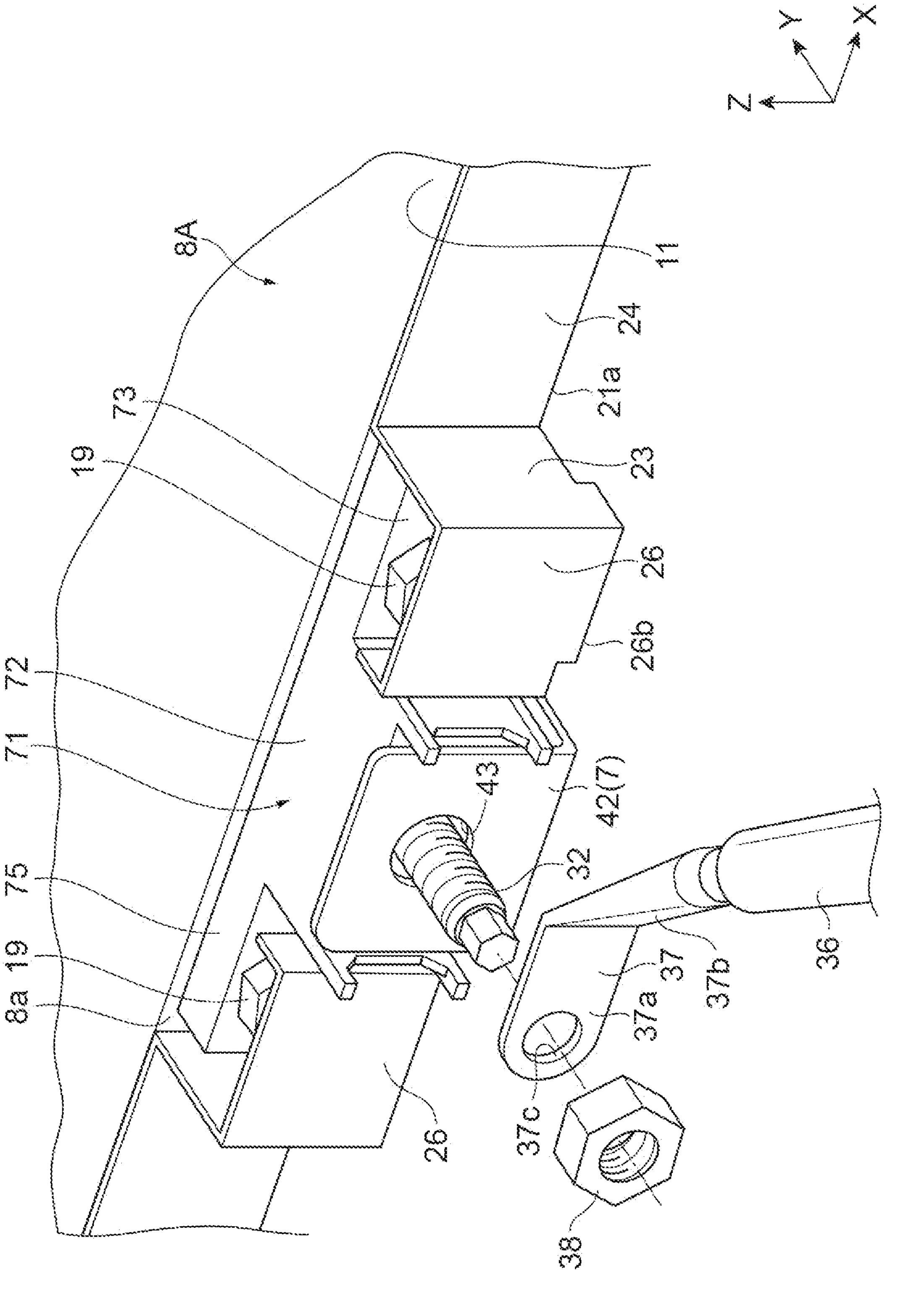
FIG. 4 is another perspective view illustrating a part in the vicinity of the terminal base in the power storage device according to the example.

FIG. 3 is a perspective view of a part in the vicinity of a terminal base on the negative electrode side in the power storage device viewed from the lower side. FIG. 4 is a perspective view of a part in the vicinity of the terminal base on the negative electrode side in the power storage device viewed from the upper side. FIG. 3 and FIG. 4 illustrate a state where a terminal base cover is detached from the power storage device 1. In the power storage device 1 according to the example, a part in the vicinity of the positive electrode terminal may also have a similar constitution.

As illustrated in FIG. 3 and FIG. 4, the negative electrode terminal 7 has a first piece portion 41, a second piece portion 42, and a bent portion 47, thereby constituting substantially an L-shape when viewed in the X axis direction. The first piece portion 41 is a plate-shaped part extending in the Y axis direction from the outer edge portion 15*a* that is an edge of the main body portion 15 when viewed in the Z axis direction. The second piece portion 42 is a plate-shaped part bent in the stacking direction toward the terminal base 70 side (the positive side in the Z axis direction) from the tip portion of the first piece portion 41 and attached to the terminal base 70. A penetration hole 43 penetrating the second piece portion 42 in the Y axis direction is formed at a substantially center position thereof. The terminal bolt 32 is inserted through the penetration hole 43. Both the first piece portion 41 and the second piece portion 42 extend in the X axis direction in a parallel manner. The sizes of the first piece portion 41 and the second piece portion 42 in the X axis direction are the same. The bent portion 47 is a part connecting the first piece portion 41 and the second piece portion 42 to each other. The bent portion 47 is formed by bending a plate material constituting the negative electrode terminal 7.

A spring portion 50 for relaxing stress acting on the negative electrode terminal 7 is formed in the negative electrode terminal 7. This spring portion 50 can relax stress acting on the negative electrode terminal 7 after being attached in a state where the negative electrode terminal 7 is pressurized against the terminal base 70 using the terminal bolt 32 and a nut 38. The spring portion 50 according to an example includes a bending portion 51, an extending portion 53, and a bending portion 52. The bending portion 51 is formed in an end portion of the negative electrode terminal 7 on the positive side in the Y axis direction, that is, a connection portion 46 where the outer edge portion 15*a* and the negative electrode terminal 7 are connected to each other. The bending portion 51 is a part where the first piece portion 41 is curved to the terminal base 70 side in the Z axis direction. The extending portion 53 is a part extending in the Y axis direction from the bending portion 51. The bending portion 52 is a part where the first piece portion 41 is curved to a side opposite to the bending portion 51 from an end portion of the extending portion 53 on the negative side in the Y axis direction.

As illustrated in FIG. 4, the pedestal portion 71 of the terminal base 70 is fixed to the terminal base installation surface 8*a* of the restraint plate 8A using fixing bolts 19. In an example, penetration holes penetrating the terminal base 70 in the Y axis direction are respectively formed in the pair of end portions 73 and 75 constituting the pedestal portion 71. The pedestal portion 71 is fixed to the terminal base installation surface 8*a* when the fixing bolts 19 inserted through the penetration holes are fastened to the terminal base installation surface 8*a* of the restraint plate 8A. The pedestal portion 71 protrudes to the negative side in the Y axis direction beyond at least the power storage module 3.

The terminal bolt 32 protrudes in the Y axis direction from an end surface of the central portion 72 in the pedestal portion 71. The terminal bolt 32 extends parallel to the Y axis direction toward the negative side in the Y axis direction. The second piece portion 42 of the negative electrode terminal 7 and a connection terminal 37 connected to a wiring 36 are attached to this terminal bolt 32 in a form of being pressurized against the nut 38 fastened to the terminal bolt 32.

The connection terminal 37 according to an example includes a washer-shaped part 37*a* inserted through the terminal bolt 32, and a connection part 37*b* having the wiring 36 connected thereto. The wiring 36 may be pressed against the connection part 37*b*. The washer-shaped part 37*a* exhibits a plate shape and includes a penetration hole through which the terminal bolt 32 is inserted. The connection part 37*b* extends in a manner of being bent with respect to the washer-shaped part 37*a*. That is, an extending direction of the washer-shaped part 37*a* and an extending direction of the connection part 37*b* intersect each other. In the connection terminal 37 in the illustrated example, in a state where the washer-shaped part 37*a* extends along an XZ plane, the connection part 37*b* extends toward the negative side in the Y direction in a manner of intersecting the XZ plane such that the wiring 36 is likely to lie in the Y axis direction. For example, when viewed in the Z axis direction, the connection part 37*b* may intersect the X axis at an angle of approximately degrees.

The insulating plate 20A according to an example is a member formed of an insulating material such as a resin. The insulating plate 20A is provided between the current collector plate 5A and the restraint plate 8A. The insulating plate 20A is disposed such that it overlaps the entire area of the main body portion 15 of the current collector plate 5A when viewed in the Z axis direction. Accordingly, at a location where the current collector plate 5A and the restraint plate 8A face each other, electrical insulation properties between the current collector plate 5A and the restraint plate 8A are secured by the insulating plate 20A interposed therebetween.

As illustrated in FIG. 3, the insulating plate 20A has a main body portion 21 and a wall portion 24. The main body portion 21 of the insulating plate 20A is a flat plate-shaped part disposed between the main body portion 15 of the current collector plate 5A and the main body portion 11 of the restraint plate 8. The main body portion 21 has a rectangular shape of which the longitudinal direction is the Y axis direction. The wall portion 24 extends upward from an outer edge portion 21*a* of the main body portion 21 in the X axis direction. The wall portion 24 extends in the X axis direction along the outer edge portion 21*a*.

In the wall portion 24 according to an example, a terminal base protection portion 16 (covering portion) covering the pedestal portion 71 and the fixing bolts 19 is formed. The terminal base protection portion 16 is provided in a manner of protruding from the wall portion 24 to the negative side in the Y axis direction. The terminal base protection portion 16 has a box shape such that the pedestal portion 71 of the terminal base 70 is accommodated therein.

The terminal base protection portion 16 has a lower wall portion 22 extending from the main body portion 21 to the negative side in the Y axis direction, a pair of side wall portions 23 and 23 extending from the wall portion 24 to the negative side in the Y axis direction, and end wall portions 26 extending parallel to the wall portion 24 in end portions of the lower wall portion 22 and the side wall portions 23 and 23 on the negative side in the Y axis direction. The lower wall portion 22 is disposed such that an end portion of the pedestal portion 71 is covered. A recessed portion 27 further dented upward than other regions is formed in the lower wall portion 22. When viewed in the Z axis direction, the recessed portion 27 overlaps the spring portion 50 of the negative electrode terminal 7 and accommodates the spring portion 50.

The side wall portions 23 and 23 are disposed such that the end portion of the pedestal portion 71 is covered from both sides in the X axis direction. The end wall portions 26 are disposed such that the end portion of the pedestal portion 71 is covered in the Y axis direction. The end wall portions 26 have an opening therebetween such that the central portion 72 is exposed at the position of the central portion 72 of the pedestal portion 71. In addition, at the position where the opening between the end wall portions 26 is formed, wing wall portions 26*a* respectively facing the side wall portions 23 are formed (refer to FIG. 2 and FIG. 4). The fixing bolts 19 fixing the pedestal portion 71 to the terminal base installation surface 8*a* can be accommodated inside a space formed by the side wall portions 23, the lower wall portion 22, the end wall portions 26, and the wing wall portions 26*a*.

In addition, the terminal base protection portion 16 includes an engagement wall 26*b*. The engagement wall 26*b* is a wall body protruding toward the negative side in the Z axis direction along the side wall portion 23 and the end wall portion 26 on the positive side in the X axis direction. The engagement wall 26*b* according to an example exhibits an L-shape when viewed in the Z axis direction. The engagement wall 26*b* in the illustrated example is formed along a part of the end wall portion 26 on the positive side in the X axis direction from the opening and along a part of the side wall portion 23 on the end wall portion 26 side from the center.

Figure 5:
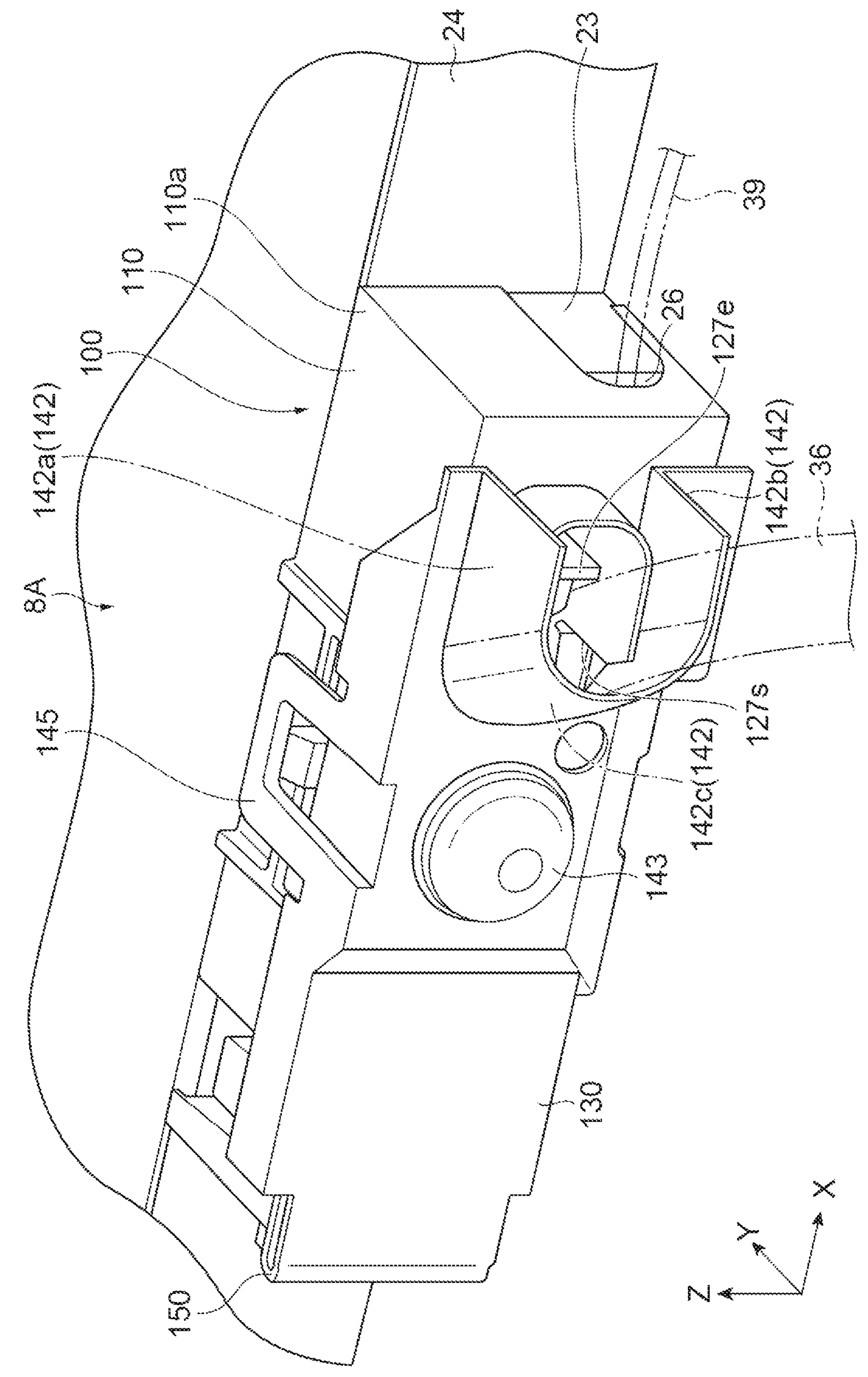
FIG. 5 is a perspective view illustrating a terminal cover according to an example mounted in the power storage device.
Figure 6:
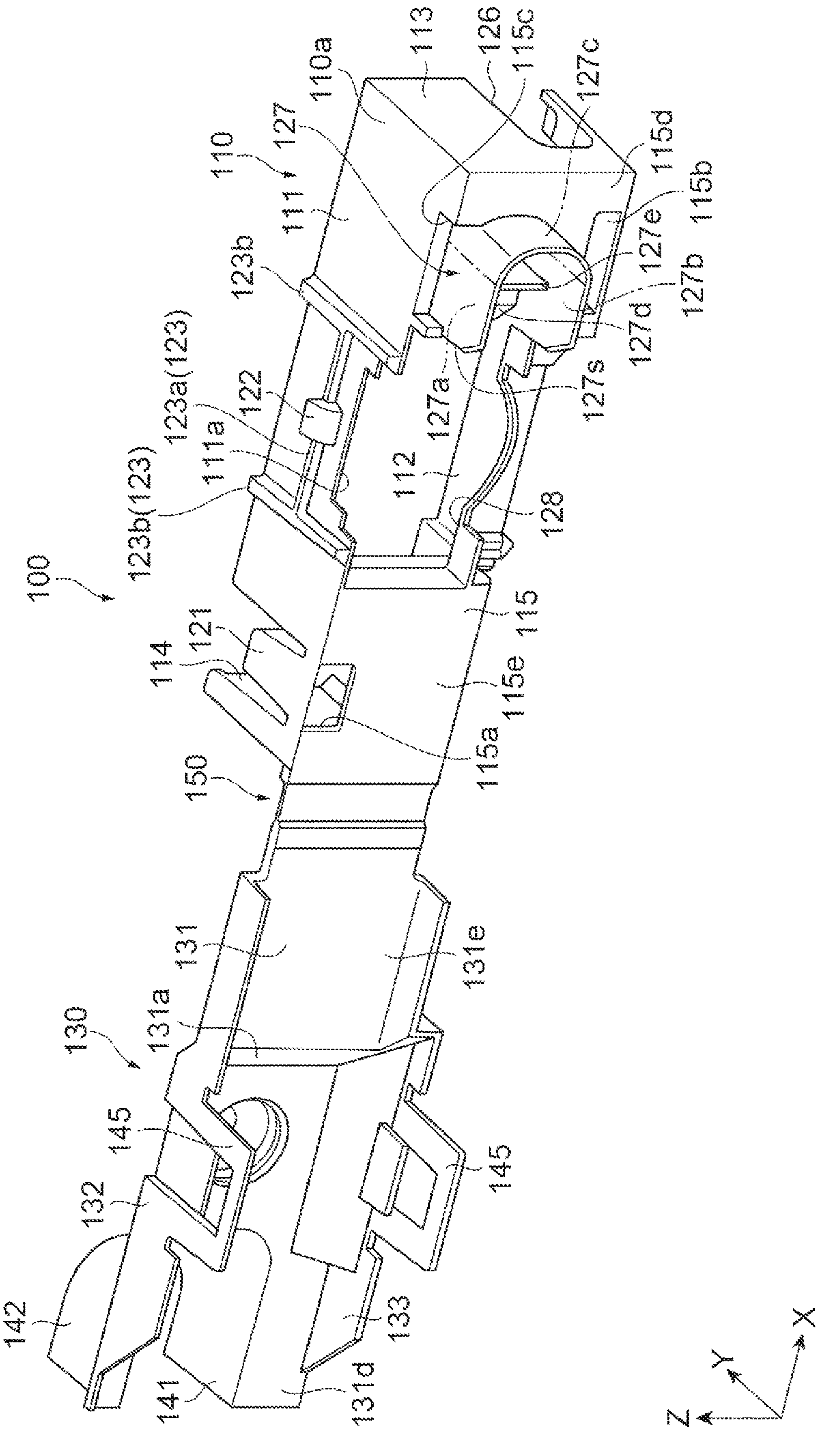
FIG. 6 is another perspective view illustrating the terminal cover according to the example.
Figure 7:
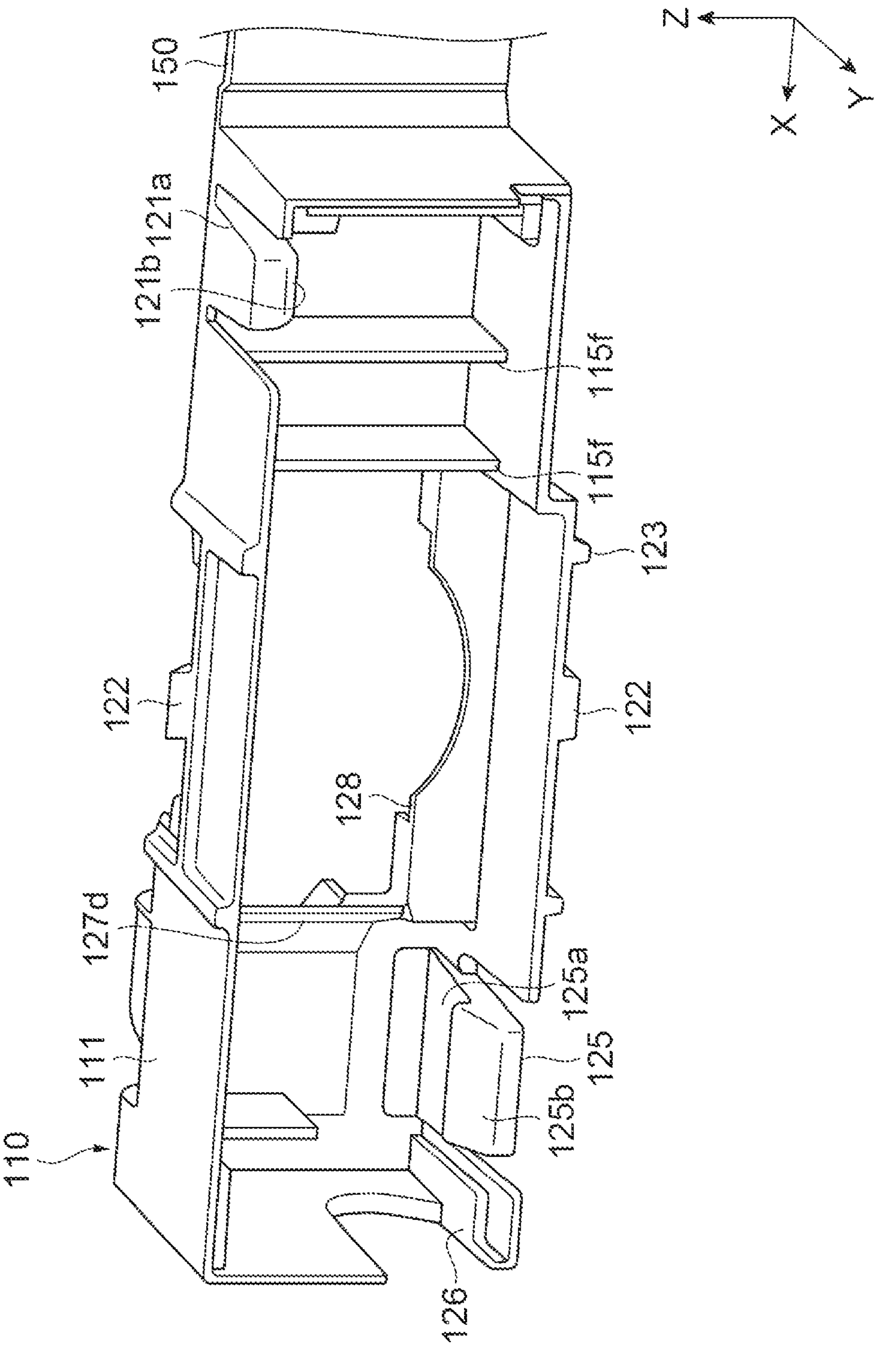
FIG. 7 is another perspective view illustrating the terminal cover according to the example.

Subsequently, a terminal cover will be described. FIG. 5 is a perspective view illustrating a terminal cover according to an example mounted in the power storage device. FIG. 6 and FIG. 7 each illustrate another perspective view of the terminal cover according to the example. The terminal cover 100 according to the example includes a base portion 110 and a cover portion 130. FIG. 5 illustrates a state where the cover portion 130 is closed with respect to the base portion 110. FIG. 6 illustrates a state where the cover portion 130 is opened with respect to the base portion 110. FIG. 7 illustrates the inward side of the base portion 110.

The terminal cover 100 is mounted in the terminal base 70 of the power storage device 1 and covers the negative electrode terminal 7 and the terminal bolt 32. In an example, substantially all the negative electrode terminal 7, the terminal bolt 32, the terminal base 70, and the terminal base protection portion 16 are covered by the terminal cover 100. The wiring 36 connected to the terminal bolt 32 is held by the terminal cover 100 in the Y axis direction that is an axial direction of the terminal bolt 32. The terminal cover 100 includes an opening 128 for guiding the wiring 36 connected to the terminal bolt 32 to the outside, and a holding portion 127 for holding the wiring 36 guided to the outside through the opening 128 in the Y axis direction. When the wiring 36 is held in the Y axis direction, the wiring 36 need only be held in a state of intersecting an XZ plane, and there is no need for the extending direction of the wiring 36 to completely coincide with the Y axis direction.

The terminal cover 100 according to the example is formed of a resin. For example, a resin constituting the terminal cover 100 may have a tolerance to an electrolytic solution in the power storage modules 3. When the power storage modules 3 are nickel-hydride secondary batteries, examples of a material of a resin include polyethylene and polypropylene.

As described above, the terminal cover 100 according to the example includes the base portion 110 and the cover portion 130. The base portion 110 and the cover portion 130 are connected to each other by a hinge portion 150. For example, the base portion 110 and the cover portion 130 are integrally formed by injection molding. The hinge portion 150 according to an example is a thin plate-shaped part connecting the base portion 110 and the cover portion 130 to each other. The hinge portion 150 has appropriate flexibility by being formed thin.

The base portion 110 is a part covering the terminal base 70 attached to the terminal base 70. The base portion 110 according to an example includes a side wall 110*a* surrounding the terminal base 70 when viewed in the Y axis direction (second direction), and an end portion wall 115 formed in an end portion of the side wall 110*a* on the negative side in the Y axis direction. The side wall 110*a* exhibits a frame shape when viewed in the Y axis direction and has a first side wall 111 and a second side wall 112 facing each other in the Z axis direction, and a third side wall 113 and a fourth side wall 114 facing each other in the X axis direction. In an example, the first side wall 111 is positioned on the positive side in the Z axis direction, and the second side wall 112 is positioned on the negative side in the Z axis direction. In addition, the third side wall 113 is positioned on the positive side in the X axis direction, and the fourth side wall 114 is positioned on the negative side in the X axis direction.

The first side wall 111 has substantially a rectangular shape when viewed in the Z axis direction. The first side wall

111 includes an engagement portion 121, a claw-shaped engagement portion (first engagement portion) 122, and an outer rib 123. The engagement portion 121 is formed at a part overlapping the end wall portion 26 formed on the negative side in the X axis direction. The engagement portion 121 includes a plate-shaped portion 121*a* extending in the Y axis direction, and a claw portion 121*b* protruding from an inner surface of the plate-shaped portion 121*a*. The plate-shaped portion 121*a* also serves as a part of the first side wall 111. In the illustrated example, the plate-shaped portion 121*a* is defined by a pair of notch portions formed from an end edge on the positive side in the Y axis direction toward the negative side in the first side wall 111. The claw portion 121*b* is engaged with an upper end edge of the end wall portion 26 formed in the terminal base protection portion 16.

The engagement portion 122 is formed, for example, substantially at the center in the X axis direction on an outer surface of the first side wall 111. The engagement portion 122 protrudes in the Z axis direction from the outer surface of the first side wall 111. The outer rib 123 is formed on the outer surface of the first side wall 111. The outer rib 123 according to an example includes a first part 123*a* formed in the X axis direction and second parts 123*b* formed in the Y axis direction. The first part 123*a* is formed, for example, substantially at the center in the X axis direction and the Y axis direction. In the illustrated example, the first part 123*a* and the engagement portion 122 are adjacent to each other. In addition, according to an example, a pair of second parts 123*b* are formed. For example, the second parts 123*b* are respectively formed in an end portion of the first part 123*a* on the positive side and an end portion thereof on the negative side in the X axis direction. The second parts 123*b* are formed from the end portion on the negative side to the end portion on the positive side in the Y axis direction in the first side wall 111.

The outer rib 123 in the illustrated example overlaps a position where the central portion 72 is formed in the X axis direction. For this reason, the distance between the pair of second parts 123*b* is substantially the same as the width of the central portion 72 in the X axis direction. In addition, in the illustrated example, a notch-shaped portion 111*a* is formed in a region between the pair of second parts 123*b*. The notch-shaped portion 111*a* is formed in an end portion of the first side wall 111 on the negative side in the Y axis direction. For example, the notch-shaped portion 111*a* may be formed up to approximately the same position in the Y axis direction as the position where the second piece portion 42 is formed.

The second side wall 112 has substantially a rectangular shape when viewed in the Z axis direction. The second side wall 112 includes an engagement portion 125. The engagement portion 125 is formed at a part overlapping the end wall portion 26 formed on the positive side in the X axis direction. The engagement portion 125 includes a plate-shaped portion 125*a* extending in the Y axis direction, and a claw portion 125*b* protruding from an inner surface of the plate-shaped portion. The plate-shaped portion 125*a* also serves as a part of the second side wall 112. In the illustrated example, the plate-shaped portion 125*a* is defined by a pair of notch portions formed from an end edge on the positive side in the Y axis direction toward the negative side in the second side wall 112. The claw portion 125*b* is engaged with the engagement wall 26*b* formed in the terminal base protection portion 16.

In addition, similar to the first side wall 111, the second side wall 112 has the engagement portion 122 and the outer rib 123. Since the constitutions of the engagement portion 122 and the outer rib 123 of the second side wall 112 are similar to those of the engagement portion 122 and the outer rib 123 of the first side wall 111, description thereof will be omitted.

The third side wall 113 has substantially a rectangular shape when viewed in the X axis direction. The third side wall 113 includes a notch-shaped portion 126. The notch-shaped portion 126 is formed from the end edge on the positive side in the Y axis direction toward the negative side. In the illustrated example, the notch-shaped portion 126 is formed in a manner of being biased to the negative side in the Z axis direction. For example, the length of the notch-shaped portion 126 in the Y axis direction is longer than the length of the side wall portion 23 in the Y axis direction. That is, an end portion of the notch-shaped portion 126 on the negative side in the Y axis direction communicates with a space between the end wall portion 26 on the positive side in the X axis direction and the end portion wall 115 of the base portion 110. In an example, a voltage detection wiring 39 connected to the terminal bolt 32 may be drawn out to the outward side of the terminal cover 100 through the notch-shaped portion 126. The fourth side wall 114 has a rectangular shape when viewed in the X axis direction. Although it is not illustrated, the fourth side wall 114 may have a notch-shaped portion similar to that of the third side wall 113.

The end portion wall 115 has substantially a rectangular shape when viewed in the Y axis direction and includes the opening 128 formed at the center in the X axis direction and directed in the Y axis direction. As described above, the opening 128 is a part for drawing out the wiring 36 connected to the terminal bolt 32 to the outside. For this reason, the opening 128 according to an example is formed in a region of the terminal base 70 overlapping the central portion 72 in which the terminal bolt 32 is provided, that is, at a center position in the X axis direction. In the X axis direction, the width of the opening 128 is larger than the width of the negative electrode terminal 7. In addition, the width of the opening 128 is formed to be approximately the same as the width of the second piece portion 42 in the Z direction. According to such a constitution, when viewed in the Y axis direction, the second piece portion 42 and the terminal bolt 32 are exposed to the outside through the opening 128.

The holding portion 127 is provided at an edge of the opening 128. The holding portion 127 in the illustrated example is disposed on the positive side of the opening 128 in the X axis direction. The holding portion 127 exhibits substantially a tubular shape in which a slit 127*s* is formed on a side facing the opening 128. The holding portion 127 according to an example includes a first wall 127*a*, a second wall 127*b*, and a third wall 127*c* protruding in the Y axis direction from an outer surface of the end portion wall 115. The first wall 127*a* and the second wall 127*b* are formed at positions facing each other with the wiring 36 sandwiched therebetween in the Z axis direction intersecting the X axis direction that is an arrangement direction of the opening 128 and the holding portion 127. As illustrated in FIG. 6, each of the first wall 127*a* and the second wall 127*b* according to an example may have a flat plate shape along an XY plane. When viewed in the Y axis direction, the first wall 127*a* may be curved into an arc shape in a manner of projecting to the positive side in the Z axis direction. In addition, when viewed in the Y axis direction, the second wall 127*b* may be curved into an arc shape in a manner of projecting to the negative side in the X axis direction.

The third wall 127*c* connects the first wall 127*a* and the second wall 127*b* to each other on a side far from the opening 128 in the X axis direction. As illustrated in FIG. 6, when viewed in the Y axis direction, the third wall 127*c* according to an example may be curved into an arc shape in a manner of projecting to the positive side in the X axis direction. When viewed in the Y axis direction, the third wall 127*c* may linearly connect the first wall 127*a* and the second wall 127*b* to each other. For example, when viewed in the Y axis direction, the third wall 127*c* may linearly extend in the Z axis direction. In addition, the holding portion 127 may not have the third wall 127*c*. In this case, the wiring 36 is held by the first wall 127*a* and the second wall 127*b*.

The end portion wall 115 may include a slope 127*d* on the inward side of the holding portion 127. The slope 127*d* is a surface inclined to the positive side in the Y axis direction from the inward side part of the holding portion 127 toward the edge of the opening 128. In addition, an internal wall 127*e* protruding to the negative side in the Y axis direction is formed on the inward side of the holding portion 127. The internal wall 127*e* connects the first wall 127*a* and the second wall 127*b* to each other. In addition, in the Y axis direction, the height of the internal wall 127*e* is shorter than the heights of the first wall 127*a* and the second wall 127*b*. For example, the internal wall 127*e* and the slope 127*d* are separated from each other, and the internal wall 127*e* is formed on the positive side in the X axis direction from the slope 127*d*.

In addition, in the end portion wall 115, an opening 115*a* is formed at a position overlapping the engagement portion 121 when viewed in the Y axis direction. In the X axis direction, the size of the opening 115*a* is equal to or larger than the size a plate-shaped portion 131121*a* of the engagement portion 121. In addition, in the Z axis direction, the size of the opening 115*a* is equal to or larger than the size of the claw portion 121*b*. In the end portion wall 115, an opening 115*b* is formed at a position overlapping the engagement portion 125 when viewed in the Y axis direction. In the X axis direction, the size of the opening 115*b* is equal to or larger than the size of a plate-shaped portion 131125*a* of the engagement portion 125. In addition, in the Z axis direction, the size of the opening 115*b* is equal to or larger than the size of the claw portion 125*b*. The end portion wall 115 in the illustrated example has a step portion 115*c* at a position overlapping the third wall 127*c* in the X axis direction. Accordingly, in the X axis direction, a part 115*d* of the end portion wall 115 on the positive side from the step portion 115*c* sticks out to the negative side in the Y axis direction compared to a part 115*e* on the negative side from the step portion 115*c*.

In addition, an inner rib 115*f* is provided on an inner surface of the end portion wall 115 (refer to FIG. 7). The inner rib 115*f* protrudes from the inner surface of the end portion wall 115 toward the positive side in the Y axis direction. The inner rib 115*f* in the illustrated example is formed on the negative side in the X axis direction from the opening 128. For example, the inner rib 115*f* extends from the end portion on the positive side in the Z axis direction to the end portion on the negative side in the end portion wall 115.

The cover portion 130 is a part covering at least the opening 128 of the base portion 110. The cover portion 130 can be attached to the base portion 110. In the illustrated example, the cover portion 130 and the base portion 110 can be fixed by being engaged with each other. The cover portion 130 according to an example includes a plate-shaped portion 131 covering the end portion wall 115, and a pair of protruding pieces 132 and 133 protruding from the plate-shaped portion 131 such that a part of the side wall 110*a* is covered. The plate-shaped portion 131 in the illustrated example has substantially a rectangular shape when viewed in the Y axis direction. In addition, in the plate-shaped portion 131, an accommodation portion 101*d* accommodating a tip of the terminal bolt 32 is formed at a position corresponding to the terminal bolt 32. The accommodation portion 101*d* exhibits a dome shape protruding the negative side in the Y axis direction.

The plate-shaped portion 131 has a notch-shaped portion 141 at a position corresponding to the holding portion 127. In addition, the plate-shaped portion 131 has a peripheral wall 142 (wall body) formed along a peripheral edge of the notch-shaped portion 141. The peripheral wall 142 covers the slit 127*s* of the holding portion 127 from a lateral side (that is, in the X axis direction) in a state where the cover portion 130 is closed (refer to FIG. 5). The peripheral wall 142 according to an example includes a fourth wall 142*a*, a fifth wall 142*b*, and a sixth wall 142*c* (wall bodies) protruding in the Y axis direction from an outer surface of the plate-shaped portion 131. The fourth wall 142*a* and the fifth wall 142*b* are formed at positions facing each other in the Z axis direction. In the Z axis direction, the distance between the fourth wall 142*a* and the fifth wall 142*b* is longer than the distance between the first wall 127*a* and the second wall 127*b* of the holding portion 127, that is, the first wall 127*a* and the second wall 127*b* can be accommodated in a space between the fourth wall 142*a* and the fifth wall 142*b*.

The sixth wall 142*c* connects the fourth wall 142*a* and the fifth wall 142*b* to each other. The sixth wall 142*c* is formed at a position facing the third wall 127*c* of the holding portion 127 with the wiring 36 sandwiched therebetween in a state where the cover portion 130 is closed. That is, the sixth wall 142*c* is disposed such that the slit 127*s* of the holding portion 127 is covered in a state where the cover portion 130 is closed. When viewed in the Y axis direction, the sixth wall 142*c* may be curved into an arc shape in a manner of projecting to the negative side in the X axis direction. In addition, the sixth wall 142*c* may be inclined in a manner of being parallel to the inclination of the slope 127*d* when viewed in the Z axis direction.

The plate-shaped portion 131 has a step portion 131*a* (refer to FIG. 6). The position of the step portion 131*a* corresponds to an end portion of the opening 128 on the negative side in the X axis direction in a state where the cover portion 130 is closed. As illustrated in FIG. 6, a part 131*d* of the plate-shaped portion 131 on the negative side in the X axis direction from the step portion 131*a* sticks out to the positive side in the Y axis direction compared to a part 131*e* on the positive side from the step portion 131*a*. That is, in a state where the cover portion 130 is closed, the part 131*d* on the positive side in the X axis direction from the step portion 131*a* sticks out to the negative side in the Y axis direction compared to the part 131*e* on the negative side from the step portion 131*a*. In the Y axis direction, the height of the step portion 115*c* formed in the end portion wall 115 of the base portion 110 and the height of the step portion 131*a* of the plate-shaped portion 131 may be substantially the same.

The pair of protruding pieces 132 and 133 are formed at an end edge of the plate-shaped portion 131 extending in the X axis direction. That is, the pair of protruding pieces 132 and 133 face each other in the Z axis direction. In the Z axis direction, the distance between the pair of protruding pieces 132 and 133 may be substantially the same as the distance between the outer rib 123 of the first side wall 111 and the outer rib 123 of the second side wall 112 in the base portion 110. Engagement pieces (second engagement portions) 145 engaged with the engagement portions 122 formed in the first side wall 111 and the second side wall 112 are formed in the pair of respective protruding pieces 132 and 133.

Since the hinge portion 150 is bent, when an inner surface of the plate-shaped portion 131 in the cover portion 130 and the outer surface of the end portion wall 115 in the base portion 110 are aligned, the base portion 110 is fitted between the pair of protruding pieces 132 and 133. Further, when the engagement pieces 145 provided in the pair of respective protruding pieces 132 and 133 are engaged with the engagement portions 122 formed in the first side wall 111 and the second side wall 112, the cover portion 130 is in a closed state with respect to the base portion 110. The engagement pieces 145 according to an example may be constituted by openings having sizes corresponding to the engagement portions 122.

In a state where the cover portion 130 is closed with respect to the base portion 110, a gap is formed between the inner surface of the plate-shaped portion 131 and the outer surface of the end portion wall 115 in the base portion 110. In addition, gaps corresponding to the thickness of the outer rib 123 are formed between the outer surfaces of the first side wall 111 and the second side wall 112 and the inner surfaces of the protruding pieces 132 and 133. That is, in a state where the cover portion 130 is engaged with the base portion 110, a gap allowing communication through the opening 128 to the outside of the terminal cover 100 is formed between the outer surface of the base portion 110 and the inner surface of the cover portion 130.

As described above, the power storage device 1 includes the stacked body 2 stacked in the Z axis direction, a pair of current collector plates 5 stacked at both ends of the stacked body in the Z axis direction, the restraint plates 8 sandwiching and restraining the stacked body 2 and the pair of current collector plates 5 in the Z axis direction, the terminal bolt 32 electrically connected to the negative electrode terminal 7 of the current collector plate 5 and protruding in the Y axis direction intersecting the Z axis direction, the terminal base 70 provided on the terminal base installation surface **8*a* extending in the X axis direction and the Z axis direction in the restraint plate 8 and having the terminal bolt 32 fixed thereto, an power output wiring 36 fixed to the terminal bolt 32, and the terminal cover 100 mounted in the terminal base 70. The terminal cover 100 is attached to the terminal base 70 and covers the terminal base 70. The terminal cover 100 includes the base portion 110 having the opening 128 exposing the terminal bolt 32, and the cover portion 130 attached to the base portion 110 and covering at least the opening 128. The base portion 110 has the holding portion 127 provided adjacent to the opening 128 and holding the wiring 36 drawn out in the Y axis direction from the terminal base 70. The holding portion 127 has the first wall 127*a* and the second wall 127*b* protruding in the Y axis direction from the base portion 110 and facing each other with the wiring 36** sandwiched therebetween.

When the terminal cover 100 is attached to the power storage device 1, a worker first mounts the base portion 110 in the power storage device 1 in a state where the terminal cover 100 is opened. That is, the engagement portion 121 and the engagement portion 125 of the base portion 110 are engaged with the end wall portion 26 and the engagement wall **26*b*. Subsequently, the worker inserts the terminal bolt 32 through the penetration hole of the washer-shaped part 37*a* of the connection terminal 37 having the wiring 36 connected thereto inside the opening 128. Further, the connection terminal 37 is fixed to the terminal bolt 32 by fastening the nut 38 to the terminal bolt 32. When the nut 38 is fastened, the wiring 36 or the connection part 37*b* may be held by the holding portion 127. In addition, the wiring 36 or the connection part 37*b* may abut the slope 127*d* and the internal wall 127*e*. When the wiring 36 and the like abut the slope 127*d* and the internal wall 127*e*, the direction of the wiring 36** and the like can reliably lie in the Y axis direction.

Subsequently, the cover portion 130 is closed. That is, when the hinge portion 150 is bent, the base portion 110 is fitted between the protruding pieces 132 and 133 of the cover portion 130, and the engagement pieces 145 of the cover portion 130 are engaged with the engagement portions 122 of the base portion 110. In a state where the cover portion 130 is closed, the wiring 36 is drawn out to the outside of the terminal cover 100 in the Y axis direction from the inward side of the holding portion 127 and the peripheral wall 142.

In this manner, in the embodiment of the present disclosure, in a state where the terminal cover 100 is attached to the terminal base 70 such that the negative electrode terminal 7 and the terminal bolt 32 are covered, while contact between the terminal bolt 32 and other objects is curbed, the wiring 36 connected to the terminal bolt 32 can be guided to the outside of the terminal cover 100 through the opening 128. Since the terminal cover 100 is provided with the holding portion 127, the wiring 36 drawn out to the outside is drawn out in the Y axis direction, that is, the extending direction of the terminal bolt 32. For example, when the wiring is drawn out to the outside in the X axis direction, since there is concern regarding interference with the wiring, it may be difficult to dispose a component or the like adjacent to the terminal cover 100. In the foregoing power storage device, since the wiring 36 is drawn out in the Y axis direction, for example, other components such as a sensor for monitoring a pressure can be disposed on the terminal base installation surface **8*a* adjacent to the terminal cover 100**.

In addition, when the wiring is drawn out to the outside in the X axis direction, it is conceivable that corotation of the wiring 36 be curbed by providing a projection or the like for holding the wiring 36 in the terminal base. However, when the wiring 36 is drawn out in the Y axis direction as described above, since the wiring 36 extends in a direction away from the terminal base 70, there is a probability that the wiring 36 will not be able to be held even if a projection is provided in the terminal base. According to the foregoing power storage device 1, the wiring 36 which has passed through the opening 128 is held in a space defined by the first wall **127*a* and the second wall 127*b* facing each other. Therefore, when the wiring 36 is fastened using the nut 38, corotation of the wiring 36 is curbed by the wiring 36 abutting the first wall 127*a* or the second wall 127*b***.

The holding portion 127 further has the third wall **127*c* protruding in the Y axis direction from the base portion 110 and connecting the first wall 127*a* and the second wall 127*b* to each other and exhibits substantially a tubular shape in which the slit 127*s* is formed on a side facing the opening 128. In this constitution, the wiring 36 which has passed through the opening 128 is held inside the holding portion 127 having substantially a tubular shape through the slit 127*s*. Since the slit 127*s* is formed, the wiring 36 can be easily connected after the base portion 110 is fixed to the power storage device 1**.

In a state where the cover portion 130 is attached to the base portion 110, the cover portion 130 may have a wall body (the peripheral wall 142, particularly the sixth wall 142*c*) facing the third wall 127*c* with the wiring 36 sandwiched therebetween and covering the slit 127*s*. In this constitution, since the slit 127*s* of the holding portion 127 is covered by the wall body, insulation properties of the terminal bolt 32 can be enhanced.

The base portion 110 and the cover portion 130 may be fixed by being engaged with each other. In this constitution, the cover portion 130 can be simply fixed to the base portion 110.

The base portion 110 and the cover portion 130 are connected to each other by the hinge portion 150. In this constitution, since the base portion 110 and the cover portion 130 are integrated, the base portion 110 can be easily covered by the cover portion 130, for example.

The base portion 110 includes the side wall 110*a* surrounding the terminal base 70 when viewed in the Y axis direction, and the end portion wall 115 provided with the opening 128. The cover portion 130 includes the plate-shaped portion 131 covering the end portion wall 115, and the protruding pieces 132 and 133 protruding from the plate-shaped portion 131 such that a part of the side wall 110*a* is covered. The engagement portions 122 may be formed in the side wall 110*a* of the base portion 110, and the engagement pieces 145 engaged with the engagement portions 122 may be formed in the protruding pieces 132 and 133 of the cover portion 130. In this constitution, due to a simple constitution, the cover portion 130 can be engaged with the base portion 110.

In a state where the cover portion 130 is engaged with the base portion 110, a gap allowing communication through the opening 128 to the outside of the terminal cover 100 may be formed between the outer surface of the base portion 110 and the inner surface of the cover portion 130. For example, when a terminal such as the negative electrode terminal 7 is covered by the terminal cover, it is conceivable that the terminal generate heat due to electrification so that heat be trapped around the terminal covered by the terminal cover. In the foregoing constitution, heat trapped on the inward side of the base portion 110 can be guided to the outside through the gap.

An outer surface of the side wall 110*a* of the base portion 110 has the outer rib 123 adjacent to the engagement portion 122. In this constitution, the strength of the side wall 110*a* and the engagement portion 122 can be enhanced.

The inner surface of the end portion wall 115 of the base portion 110 has the inner rib 115E In this constitution, the strength of the base portion 110 can be enhanced.

Hereinabove, the embodiment has been described in detail with reference to the drawing. However, a specific constitution thereof is not limited to this embodiment.

Figure 8:
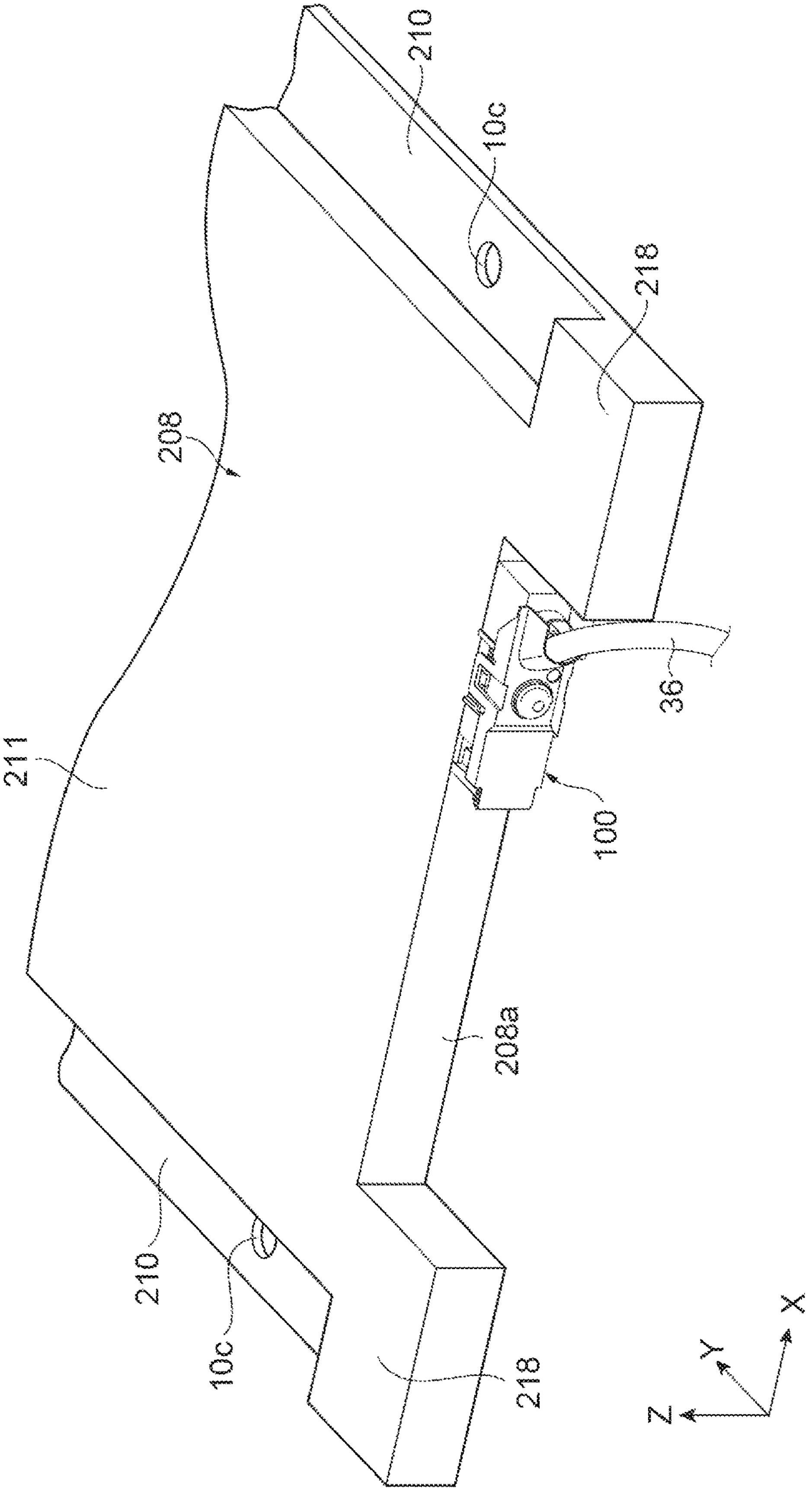
FIG. 8 is an explanatory perspective view of a restraint plate in the power storage device according to another example.

For example, an example in which the terminal base installation surface 8*a* intersecting the Y axis direction of the restraint plate 8 is formed flat in the X axis direction has been described, but the shape of the terminal base installation surface 8*a* is not limited to a flat shape. FIG. 8 illustrates a restraint plate according to another example. In place of the restraint plate 8, the power storage device 1 may include a restraint plate 208 illustrated in FIG. 8. The restraint plate 208 has a main body portion 211 having substantially a rectangular plate shape, and projecting portions 218 projecting in the Y axis direction beyond the main body portion 211. The main body portion 211 in the illustrated example has a terminal base installation surface 208*a* that is a side surface extending in the X axis direction when viewed in the Z axis direction. In addition, the main body portion 211 has step portions 210 formed in the Y axis direction at both end edges in the X axis direction. The step portions 210 are parts stepped down to the inward side in the Z axis direction from the main body portion 211. The step portions 210 are each provided with the insertion hole 10*c*.

The projecting portions 218 protrude in the Y axis direction in both end portions on the terminal base installation surface 208*a* of the main body portion 211 in the X axis direction. The projecting portions 218 in the illustrated example are formed at both ends on the terminal base installation surface 208*a* of the main body portion 211 in the X axis direction, that is, at positions including the step portions 210. The shapes of the projecting portions 218 are not particularly limited. However, in an example, the shapes may be substantially rectangular parallelepiped shapes. The projecting portions 218 in the illustrated example exhibit substantially rectangular parallelepiped shapes constituted such that the size in the Z axis direction is substantially the same as the size of the terminal base installation surface 208*a*, the size in the X axis direction is substantially the same as that of the terminal cover 100, and the size in the Y axis direction is larger than that of the terminal cover 100.

The terminal cover 100 is attached to the terminal base (not illustrated in FIG. 8) disposed on the terminal base installation surface 208*a* between the pair of projecting portions 218 when viewed in the Z axis direction. In the illustrated example, the pair of projecting portions 218 project to the negative side in the Y axis direction beyond the terminal cover 100. The terminal cover 100 and the terminal base (not illustrated in FIG. 8) may be disposed in a manner of being biased to a side of one projecting portion 218 between the pair of projecting portions 218. For example, the terminal cover 100 and the terminal base (not illustrated in FIG. 8) in the illustrated example are disposed close to the projecting portion 218 provided on the positive side in the X axis direction. For example, the distance between the terminal cover 100 and the projecting portions 218 may be shorter than the diameter of the wiring 36. In addition, the terminal cover 100 and the projecting portions 218 may come into contact with each other.

In this manner, the restraint plates 8 may have the pair of projecting portions 218 projecting in the Y axis direction from the terminal base installation surface 8*a* extending in the X axis direction when viewed in the Z axis direction, and the terminal base 70 may be disposed between the pair of projecting portions 218 when viewed in the Z axis direction. When the wiring 36 is drawn out to the outside in the X axis direction, since there is concern regarding interference with the wiring, it may be difficult to dispose the terminal cover 100 close to the projecting portions 218. In the present disclosure, since the wiring 36 is drawn out in the Y axis direction from the terminal cover 100, even if the projecting portions 218 and the terminal base 70 are close to each other, the wiring 36 does not interfere with the projecting portions 218. When the terminal base 70 is disposed between the projecting portions 218, the projecting portions 218 can function as protection walls for protecting the terminal base 70.

In addition, in the foregoing embodiment, an example in which a terminal cover covers a negative electrode terminal provided on the upper side in the Z axis direction has been described, but a terminal cover having a similar constitution may also be provided in a positive electrode terminal provided on the lower side in the Z axis direction. In addition, regarding the positive electrode terminal, a terminal cover having a constitution different from that of the foregoing terminal cover may be provided.

In addition, an example in which a base portion, a cover portion, and a hinge portion are formed by integral molding has been described, but the base portion and the cover portion may be formed as separate bodies. In this case, the base portion and the cover portion may be connected to each other by a hinge portion. The hinge portion may be formed integrally with the base portion or the cover portion.

What is claimed is:

1. A power storage device comprising:
a stacked body configured to have a power storage module in which electrodes including a plurality of bipolar electrodes are stacked in a first direction;
a pair of current collector plates configured to be stacked at both ends of the stacked body in the first direction, wherein a first current collector plate of the pair of current collector plates is stacked at one end of the stacked body and a second current collector plate of the pair of current collector plates is stacked at another end of the stacked body;
a pair of restraint plates configured to sandwich and restrain the stacked body and the pair of current collector plates in the first direction;
a terminal base configured to have a terminal bolt fixed thereto, the terminal bolt being electrically connected to a terminal of at least one of the pair of current collector plates and protruding in a second direction intersecting the first direction, wherein the terminal base is provided on a terminal base installation surface of the at least one of the pair of restraint plates, the terminal base installation surface being a side surface of the at least one of the pair of restraint plates extending in a third direction intersecting both the first direction and the second direction, and extending in the first direction;
a power output wiring configured to be fixed to the terminal bolt; and
a terminal cover configured to be mounted in the terminal base,
wherein the terminal cover is configured to include
a base portion attached to the terminal base, covering the terminal base, and having an opening exposing the terminal bolt; and
a cover portion attached to the base portion and covering at least the opening,
wherein the base portion is configured to have a holding portion provided adjacent to the opening and holding the power output wiring drawn out in the second direction from the terminal base, and
wherein the holding portion is configured to have a first wall and a second wall protruding in the second direction from the base portion and facing each other with the power output wiring sandwiched therebetween.

2. The power storage device according to claim 1,
wherein the holding portion is configured to further have a third wall protruding in the second direction from the base portion and connecting the first wall and the second wall to each other, and wherein the holding portion exhibits substantially a tubular shape having a slit formed on a side of the holding portion facing the opening.

3. The power storage device according to claim 2,
wherein the cover portion is configured to have a wall body facing the third wall with the power output wiring sandwiched therebetween and covering the slit.

4. The power storage device according to claim 1,
wherein the base portion and the cover portion are configured to be connected to each other by a hinge portion.

5. The power storage device according to claim 4,
wherein the base portion is configured to include a frame-shaped side wall surrounding the terminal base when viewed in the second direction and an end portion wall having the opening provided therein,
wherein the cover portion is configured to include a plate-shaped portion covering the end portion wall and a protruding piece protruding from the plate-shaped portion such that a part of the side wall is covered, and
wherein a first engagement portion is configured to be formed in the side wall of the base portion, and a second engagement portion engaged with the first engagement portion is configured to be formed in the protruding piece of the cover portion.

6. The power storage device according to claim 5,
wherein when the cover portion is engaged with the base portion, a gap is configured to be formed, the gap being separate from the opening and allowing communication through the opening to the outside of the terminal cover, between an outer surface of the base portion and an inner surface of the cover portion.

7. The power storage device according to claim 5,
wherein an outer surface of the side wall of the base portion is configured to have an outer rib adjacent to the first engagement portion.

8. The power storage device according to claim 5,
wherein an inner surface of the end portion wall of the base portion is configured to have an inner rib.

9. The power storage device according to claim 1,
wherein at least one of the pair of restraint plates is configured to have a pair of projecting portions projecting in the second direction beyond the terminal base installation surface when viewed in the first direction, and
wherein the terminal base is configured to be disposed on the terminal base installation surface between the pair of projecting portions when viewed in the first direction.

10. The power storage device according to claim 1,
wherein each of the electrodes is configured to include an electrode plate having a first surface and a second surface on a side opposite to the first surface in the first direction,
wherein the stacked body is configured to have the power storage module including a plurality of the electrodes stacked therein such that the first surfaces of the electrode plates face a same direction along the first direction, and a seal portion defining a space, the space accommodating the electrodes adjacent to each other in the first direction and accommodating an electrolyte,
wherein the electrodes included in the power storage module are configured to be constituted of
the bipolar electrodes each having the electrode plate, a positive electrode active material layer provided on the first surface of the electrode plate, and a negative electrode active material layer provided on the second surface of the electrode plate;
a positive electrode termination electrode having the electrode plate and the positive electrode active material layer provided on the first surface of the electrode plate and having the second surface of the electrode plate forming a current output surface exposed outside of the seal portion; and
a negative electrode termination electrode having the electrode plate and the negative electrode active material layer provided on the second surface of the electrode plate and having the first surface of the electrode plate forming a current output surface exposed outside of the seal portion.

* * * * *